Patented Apr. 11, 1939

2,153,994

UNITED STATES PATENT OFFICE 2,153,994

DEHYDROBINAPHTHYLENEDIIMINES

Alfred Rieche, Wolfen, Kreis Bitterfeld, and Walter Rudolph, Bitterfeld, Germany, assignors to General Aniline Works, Inc., New York, N. Y., a corporation of Delaware No Drawing. Application April 21, 1937, Serial No. 138,162. In Germany April 24, 1936

12 Claims. (Cl. 260—279)

Our present invention relates to a process for manufacturing the hitherto unknown dehydrobinaphthylenediimine of the formula

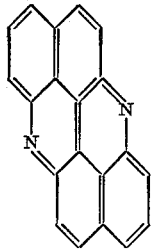

and the nuclear substitution products thereof and to a new process for manufacturing the same.

Generally our invention is based on the observation that 8-amino-2-hydroxynaphthalenes, which may or may not be acylated in the amino group form dehydrobinaphthylenediimines when subjecting the said aminohydroxynaphthalenes to treatment with a dehydrogenating agent, preferably at a raised temperature.

The procedure may be as follows: The 8-acylamino-2-hydroxynaphthalene (I), for instance, may be treated with 1 to 2 molecular proportions of ferric chloride or other suitable dehydrogenating agent over the stage of intermediate formation of 8, 8'-diacylamino-2, 2'-dihydroxy-1, 1'-binaphthalene (II) to the diacylaminobinaphthone (III), the latter may be saponified to produce the intermediary compound of the mol composition indicated at IV, which is then converted by means of an agent splitting off water, or by an expedient for fulfilling the same object, for example by heat or sublimation into the dehydrobinaphthylenediimine (V). Saponification and the splitting off water may be conducted simultaneously, for example, by heating with sulfuric acid, hydrochloric acid or phosphoric acid.

I II III

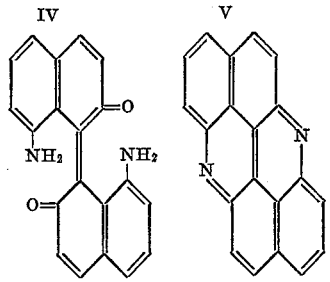

In these formulae Ac stands for acyl.

The diacylaminobihydroxynaphthalene (II) constituting the second stage may be obtained from the diacylaminobinaphthone (III) by reduction, and by oxidation, for instance, with potassium ferricyanide, may be reconverted smoothly into the diacylaminobinaphthone. Although, theoretically, 2 molecular proportions of ferric chloride are necessary for the oxidation of the acylaminonaphthol to the corresponding binaphthone, in practice a considerably smaller proportion may be used as the atmospheric oxygen takes part in the oxidation. The compounds obtained may be purified by extraction with a boiling organic solvent and reprecipitation from dilute sodium hydroxide solution.

This sequence of reactions explains the theoretical course of our procedure; it may be simplified, however, in such manner that the intermediate products are not formed in different stages and thus in a far more simple manner and in a single operation the dehydrobinaphthylenediimine and its substitution products are obtainable by mixing 8-amino-2-hydroxynaphthalene or 8-acylamino-2-hydroxynaphthalene or the nuclear substitution products thereof with the dehydrogenating agent and heating the dry mixture whereat the dehydrobinaphthylenediimine or the corresponding substitution products sublime and are obtainable in good yield.

The new compounds produced are suitable for various technical purposes, among others the manufacture of dyes.

The following examples illustrate the invention, the parts being by weight:—

*Example 1.*—100 parts of 8-acetylamino-2-hydroxynaphthalene are finely suspended in 2500 parts of water and the suspension is mixed at about 70° C. with a solution of 81 parts of ferric chloride in 450 parts of water and 50 parts of dilute hydrochloric acid. The whole is then vigorously stirred for 8 to 10 hours. The oxidation product is dissolved in sodium hydroxide solution, reprecipitated by feeble acidification with dilute hydrochloric acid and freed from separated impurities by immediate filtration. From the filtrate the 8,8'-diacetylamino-1,1'-binaphthone-(2,2') separates in pure yellow crystals of melting point 332° C. The yield amounts to 60 per cent. The crystals dissolve in caustic alkali solution to a yellow-red solution. The phenylhydrazone forms yellow crystals of melting point 314° C. (with decomposition).

100 parts of diacetylaminobinaphthone are heated to boiling with 4000 parts of sulfuric acid of 50 per cent. strength for several hours. The red solution is diluted and made alkaline; the precipitate thus produced is filtered, dried and sublimed or extracted with chlorobenzene. In this manner the dehydrobinaphthylenediimine is obtained in the form of dark red to steel-blue needles of melting point 312° C. The yield is 50 to 60 per cent. In most organic solvents the compound is sparingly soluble; in chlorobenzene and anisol it dissolves, for example, to a red-yellow solution having a green-yellow fluorescence. Strong sulfuric acid dissolves it to an intensely red solution having a green-yellow fluorescence.

Example 2.—100 parts of 8-acetylamino-5,7-dichloro-2-hydroxynaphthalene of melting point 262° C. are dissolved in 380 parts of 2n caustic soda lye and 2000 parts of water; this solution is mixed with one of 250 parts of potassium ferricyanide in 4000 parts of water. The red solution is now heated to 70 to 80° C. until the first small flocculent precipitate has become complete and crystalline. This occupies about 15 to 20 minutes. The whole is then filtered and the crystals washed with water and dried in a vacuum. The yield is 93 parts of nearly quite pure 8,8'-diacetylamino-5,7,5',7' - tetrachloro - 1,1' - binaphthone-(2,2') in the form of a yellow powder. From nitrobenzene it crystallizes in beautiful glassy yellow plates of melting point 304° C. with decomposition. In alkali the compound dissolves sparingly to a bluish-red solution. Concentrated sulfuric acid dissolves it to a greenish-yellow solution.

100 parts of 8,8'-diacetylamino-5,7,5',7'-tetrachloro-1,1'-binaphthone - (2,2') of melting point 304° C. are dissolved in 1440 parts of cold concentrated sulfuric acid. This solution is added to the still hot mixture of 1440 parts of concentrated sulfuric acid and 1440 parts of water. The blue solution which fluoresces red is diluted with water after ½ hour; the orange-red precipitate thus produced is filtered with suction, suspended in water and mixed with sufficient sodium bicarbonate to produce an alkaline reaction. The solid matter is then filtered with suction and thoroughly washed with water. After drying this product is recrystallized from nitrobenzene or 1-chloronaphthalene. The yield is 60 parts of tetrachlorodehydrodinaphthylenediimine in the form of leaflets which have the appearance of copper bronze. The compound is infusible but sublimes well. It dissolves in concentrated sulfuric acid to an intensely colored solution which appears blue by transmitted light and red by reflected light. The compound is very sparingly soluble in organic solvents.

Example 3.—100 parts of 8-acetylamino-2-hydroxynaphthalene are dissolved hot in 500 parts of nitrobenzene. 80 parts of copper oxide are introduced into the still warm solution. This mixture is heated to gently boiling for 1 hour. The solution is then filtered with suction and the residue then washed with benzene, then with ether and dried. From the dark powder which contains yellow crystals the binaphthone is isolated by several reprecipitations from dilute caustic soda lye. The yield is 60 parts of 8,8'-diacetylamino-1,1'-binaphthone-(2,2'). The diimine is further worked up in the manner described in Example 1 or 2.

Example 4.—100 parts of 8-acetylamino-2,7-dihydroxynaphthalene of melting point 225° C. are dissolved with aid of 500 parts of 2n caustic soda lye in 2500 parts of water and is introduced by drops into a mixture kept at 70° C. of 3000 parts of ferric chloride solution of 10 per cent. strength, 800 parts of 2n hydrochloric acid and 6250 parts of water. From the red solution yellow crystals soon separate being finally mixed with brown flocks. After filtering the solid matter is washed and the mass extracted with alcohol, and then with ether. The remaining pure yellow crystals, melting at 310° C. with decomposition, amount to a yield of 35 parts of 8,8'-diacetylamino-7,7'-dihydroxy - 1,1' - binaphthone - (2,2'). This compound sublimes and is soluble in concentrated sulfuric acid and in dilute caustic soda lye to blue-red solutions. From the alkaline solution it can be precipitated unchanged by means of dilute acids, and further working up is as described in Example 1 or 2.

Example 5.—8-acetylamino - 2 - hydroxynaphthalene is mixed with 2 to 3 times its weight of potassium ferricyanide and the mixture is heated to such a temperature that a sublimate is obtained. The sublimate is dehydrobinaphthylenediimine in good yield.

Instead of 8-acetylamino-2-hydroxynaphthalene, 8-amino-2-hydroxynaphthalene can be used with the same result.

Example 6.—If copper oxide is used as the dehydrogenating agent for treating the aminohydroxynaphthalene, which may or may not be acylated, there is obtained an equally good yield of dehydrobinaphthylenediimine.

Example 7.—8-amino-2-hydroxynaphthalene is mixed with some copper bronze and the mixture is heated, dehydrobinaphthylenediimine being produced.

Example 8.—A mixture of 100 parts of 8-amino-2-hydroxynaphthalene, 150 parts of nitrobenzene and 50 parts of copper oxide is heated to boiling in a reflux apparatus for 3 hours. There is formed an addition product of the aminohydroxynaphthalene to dehydrobinaphthylenediimine mixed with copper oxide. After filtration with suction and drying this mixture is heated whereby dehydrobinaphthylenediimine is produced.

It is obvious that our invention is not limited to the foregoing examples or to the specific details given therein. Thus, for instance, we may use as starting materials 8-amino-2-hydroxynaphthalenes, which may or may not be acylated in the amino group, bearing in the naphthalene nucleus other substituents, such as the alkyl-, alkoxy-, nitro-, sulfo- or carboxy group. In a number of the examples we start from the 8-acetylamino-2-hydroxynaphthalene. Since, however, the acetyl group plays no part in the process, any other acyl radicals may take the place of the acetyl group.

As mentioned above, our new products may be used as parent materials for the manufacture of dyes. Thus, for instance, olive-brown sulfur dyes are obtainable when heating together the dehydrobinaphthylenediimines with sulfur to a temperature of about 200 to about 280° C. and after-treating the crude melt with an alkali metal sulfide solution.

What we claim is:—

1. The dehydrobinaphthylenediimines corresponding to the general formula

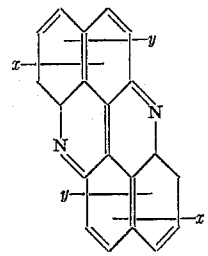

wherein $x$ and $y$ are members of the group consisting of hydrogen, halogen, ·OH, ·O alkyl, —NO₂, alkyl, ·SO₃H and ·COOH.

2. The dehydrobinaphthylenediimine corresponding to the formula

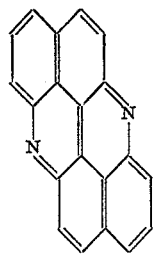

forming needles of melting point 312° C., being sparingly soluble in organic solvents, forming with strong sulfuric acid a red solution having a green yellow fluorescence.

3. The 5,7-5',7'-tetrachlorodehydrodinaphthylenediimine of the formula

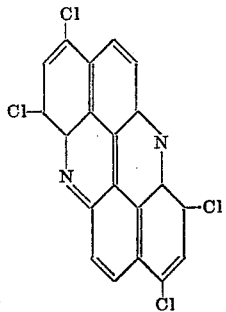

forming recrystallized from nitrobenzene or 1-chloronaphthalene leaflets, being infusible but subliming, dissolving in concentrated sulfuric acid to an intensely colored solution which appears blue by transmitted light and red by reflected light.

4. The 7,7'-dihydroxydehydrodinaphthylenediimine of the formula

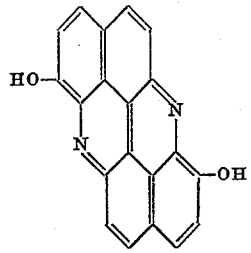

5. The process which comprises dehydrogenating an aminohydroxynaphthalene of the general formula

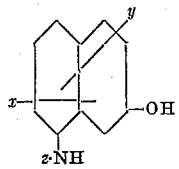

wherein $x$ and $y$ are members of the group consisting of hydrogen, halogen, ·OH, ·O alkyl, ·NO₂, alkyl, ·SO₃H, and COOH, and $z$ means an acyl radicle, to form the corresponding binaphthyl compound, saponifying the acyl radicle and splitting off water.

6. The process which comprises dehydrogenating an aminohydroxynaphthalene of the general formula

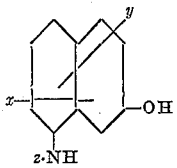

wherein $x$ and $y$ are members of the group consisting of hydrogen, halogen, ·OH, ·O alkyl, ·NO₂, alkyl, ·SO₃H, and COOH, and $z$ means an acyl radicle, to form the corresponding binaphthyl compound, and simultaneously saponifying the acyl radicle and splitting off water.

7. The process which comprises dehydrogenating an aminohydroxynaphthalene of the general formula

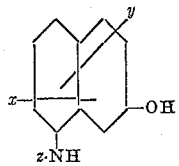

wherein $x$ and $y$ are members of the group consisting of hydrogen, halogen, ·OH, ·O alkyl, ·NO₂, alkyl, ·SO₃H, and COOH, and $z$ means an acyl radicle, with ferrichloride, to form the corresponding binaphthyl compound, saponifying the acyl radicle and splitting off water.

8. The process which comprises dehydrogenating an aminohydroxynaphthalene of the general formula

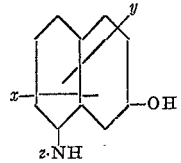

wherein $x$ and $y$ are members of the group consisting of hydrogen, halogen, ·OH, ·O alkyl, ·NO₂, alkyl, ·SO₃H, and COOH, and $z$ means an acyl radicle, with ferrichloride, to form the corresponding binaphthyl compound, and simultaneously saponifying the acyl radicle and splitting off water.

9. The process which comprises dehydrogenating an aminohydroxynaphthalene of the general formula

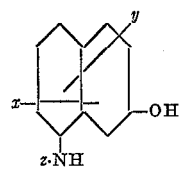

wherein $x$ and $y$ are members of the group consisting of hydrogen, halogen, ·OH, ·O alkyl, ·NO₂, alkyl, ·SO₃H, and COOH, and $z$ means an acyl radicle, with ferrichloride, to form the corresponding binaphthyl compound, and treating the product thus obtained with sulfuric acid.

10. The process which comprises dehydrogenating 8-acetylamino-2-hydroxynaphthalene with ferrichloride and treating the product thus obtained with sulfuric acid.

11. The process which comprises dehydrogenating 8 - acetylamino - 2,7 - dihydroxynaphthalene with ferrichloride and treating the product thus obtained with sulfuric acid.

12. The process which comprises dehydrogenating 8-acetylamino-5,7-dichloro-2-hydroxynaphthalene with potassium ferricyanide and treating the product thus obtained with sulfuric acid.

ALFRED RIECHE.
WALTER RUDOLPH.